Nov. 16, 1948.  S. SCHNELL  2,453,866
BRAKE WITH TWO ANCHORING SHOES AND
WEAR TAKE-UP MEANS THEREFOR
Filed April 27, 1945  4 Sheets-Sheet 1
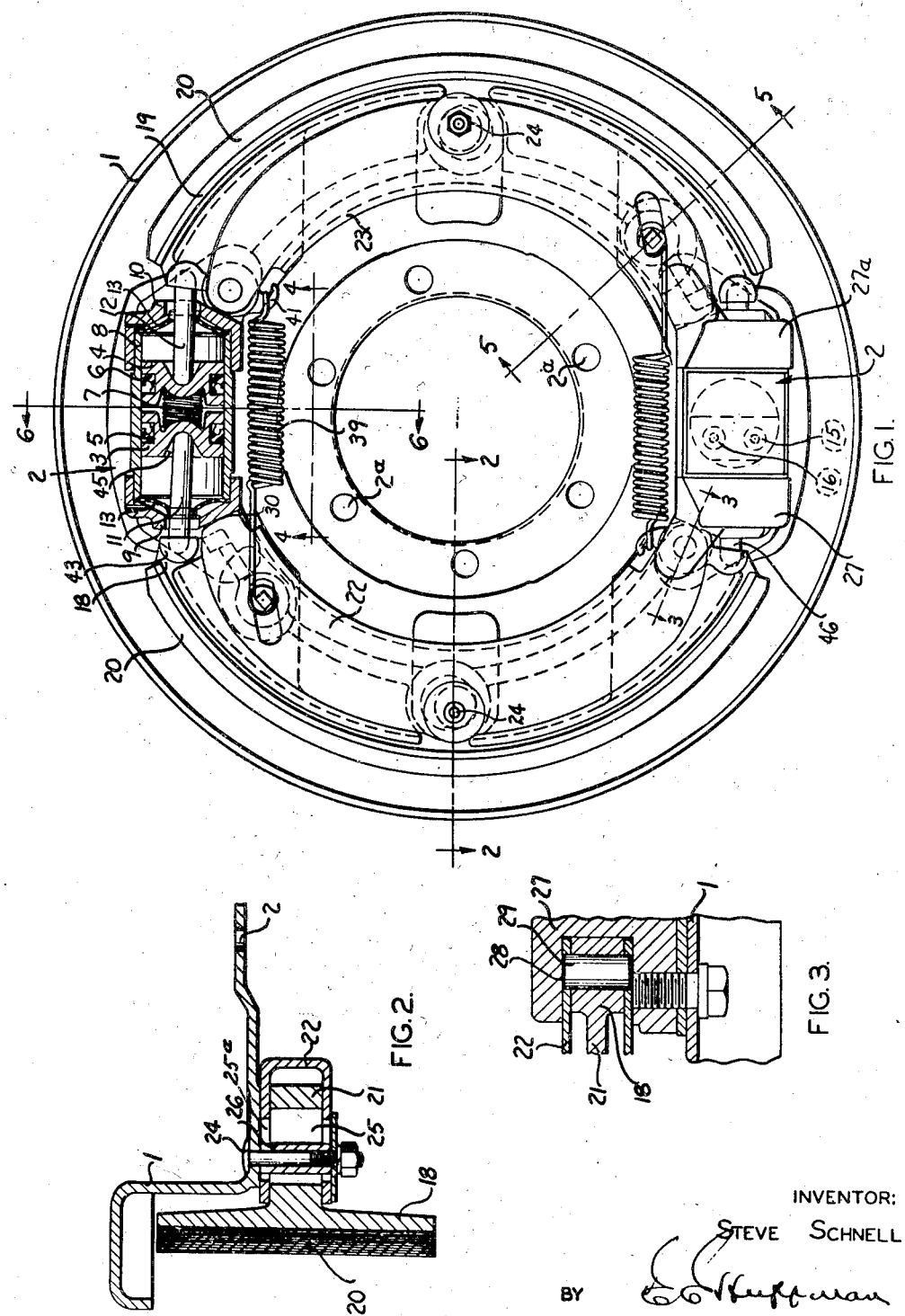
INVENTOR:
STEVE SCHNELL
BY
ATTORNEY Nov. 16, 1948.   S. SCHNELL   2,453,866
BRAKE WITH TWO ANCHORING SHOES AND
WEAR TAKE-UP MEANS THEREFOR Filed April 27, 1945   4 Sheets-Sheet 2

INVENTOR:
STEVE SCHNELL
BY
ATTORNEY

Nov. 16, 1948.    S. SCHNELL    2,453,866
BRAKE WITH TWO ANCHORING SHOES AND
WEAR TAKE-UP MEANS THEREFOR

Filed April 27, 1945    4 Sheets-Sheet 3

INVENTOR
STEVE SCHNELL
BY E. E. Huffman
ATTORNEY

Nov. 16, 1948.  S. SCHNELL  2,453,866
BRAKE WITH TWO ANCHORING SHOES AND
WEAR TAKE-UP MEANS THEREFOR

Filed April 27, 1945  4 Sheets-Sheet 4

INVENTOR
STEVE SCHNELL
BY *(signature)*
ATTORNEY.

Patented Nov. 16, 1948

2,453,866

UNITED STATES PATENT OFFICE 2,453,866

BRAKE WITH TWO ANCHORING SHOES AND WEAR TAKE-UP MEANS THEREFOR

Steve Schnell, Kirkwood, Mo., assignor to Wagner Electric Corporation, St. Louis, Mo., a corporation of Delaware Application April 27, 1945, Serial No. 590,579

19 Claims. (Cl. 188—78)

This invention relates to hydraulically operated brakes and in its more specific aspects is directed to a brake having two forward shoes in which the torque is taken up by an auxiliary member instead of by an anchor pin or by the brake cylinder.

One of the objects of the invention is to provide a two forward shoe brake in which the braking thrust is taken up by an auxiliary member mechanically associated with the brake cylinder but forming no actual part thereof.

Another object of the invention is to provide a two forward shoe brake in which the elements of the brake comprise a shoe and a channel member to receive same.

Still another object of the invention is to provide a two forward shoe hydraulic brake in which the thrust of the brake in one direction is taken up by the brake shoe per se and in the reverse direction is taken up by the channel member associated with the brake shoe.

A further object of the invention is to provide a brake assembly of the two forward shoe brake type in which the cylinder portion of the brake operating motor floats in the elements supporting same such that no brake thrust is taken up by the cylinder of the brake operating motor.

Another and still further object of the invention is to provide a two forward shoe brake in which the braking elements comprise a channel element receiving the web of a brake shoe and in which the forward thrust is taken up by the brake shoe and the reverse thrust is taken up by the channel element in such a manner that the brake thrust is not absorbed by any portion of the brake operating motor.

Other and further objects of the invention will occur to those skilled in the art to which this application pertains as the description proceeds, which, taken in connection with the accompanying drawings, sets forth a preferred embodiment of the invention and selected modifications thereof but such disclosures are not to be construed as a limitation of the invention which is limited only by the appended claims, and any and all modifications, alterations and variations of structure coming within the spirit and scope thereof are deemed to be included herein.

In the drawings:

Figure 1 shows an elevational view, partly in section, of a device embodying the invention;

Figure 2 is a sectional view taken along the line 2—2 of Figure 1;

Figure 3 is a sectional view taken along the line 3—3 of Figure 1;

Figure 4:
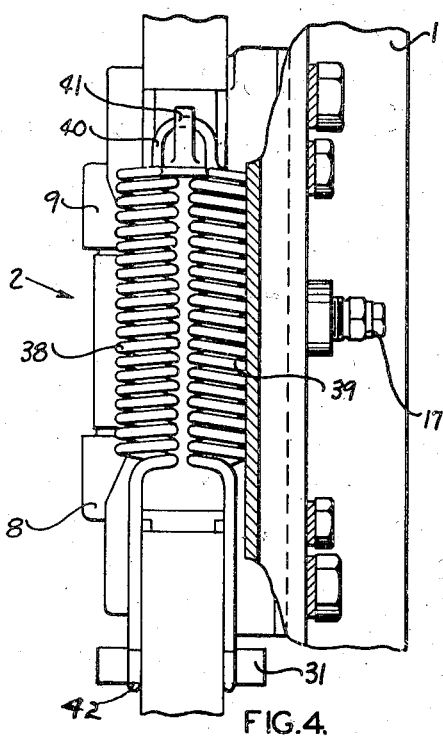
Figure 4 is a view showing the retracting spring looking along the direction of line 4—4 of Figure 1.

Various expedients have been employed in the brake art to secure a two shoe performance of automotive or other brakes in order to increase the efficiency thereof. In the hydraulic brake art whenever a two forward shoe operation has been accomplished, the anchoring has usually been taken on the brake cylinder or brake operating motor necessitating a special structure therein to enable the brake thrust to be absorbed thereby. The teachings of the mechanical brake art to effect the two forward shoe operation are not applicable to hydraulic brakes because there is no fixed and rigid connection between the ends of the brake shoe and the brake operating member. Therefore, whenever a two forward shoe operation is desired in hydraulic brakes, auxiliary means must be provided to absorb the brake thrust or else the brake thrust must be taken up by a specially constructed brake operating motor, thereby reducing the over-all efficiency of the device. This invention provides a means by which the brake thrust may be taken up by a member associated with the brake operating motor but not affecting the motor which permits the cylinder element of the brake operating motor to have floating motion with respect to a pair of supports and in which the supports themselves absorb the thrust in either forward or reverse operation of the brake.

The several objects and advantages are achieved in the device set forth in the several drawings in which numeral 1 is a backing plate conventional in character and securable to the housing of the rear axle of an automotive vehicle or to the forging supporting the axle of the front wheels. Rotatably mounted with respect to the backing plate is a brake drum (not shown) conventional in character and secured to the wheel of the vehicle. The backing plate 1 is provided with a plurality of apertures 2a by means of which it is secured to the rear axle housing or the forging previously mentioned. The backing plate has a pair of brake operating motors or cylinders 2 mounted thereon having piston elements 3 and 4 therein provided with sealing members 5 and 6 resting against pistons 3 and 4. Disposed between the sealing elements 5 and 6 and pistons 3 and 4 is a spring 7. The pistons are arranged within a cylinder 8 which is slidable in abutment elements 9 and 10. These latter elements are secured to the backing plate by bolting in the conventional manner in order that they may be retained in position. The pistons have rods 11 and 12 freely socketed therein which extend through and are freely slidable in apertures provided in the abutment elements 9 and 10. There is no physical contact between rods 11 and 12 and the abutment elements. Snugly fitting rods 11 and 12 are dust protecting elements 13, 13 the periphery of which is arranged between the ends of cylinder 8 and abutments 9 and 10. As previously indicated, cylinder 8 is not rigidly supported in elements 9 and 10 but is freely movable therein and for that reason protecting elements 13, 13, formed from some rubber or rubber-like material, are fitted on rods 11 and 12 to enclose the cylinder ends in order to prevent the entrance of foreign gritty matter therein.

The brake cylinder has the usual projection 14 thereon which extends through an appropriate aperture in backing plate 1 and has provided therein a pair of bores 15 and 16, the latter bore intended to receive the output of a compensator which may be the same or similar to that set forth in United States Patent No. 1,758,671, issued May 13, 1930. The other bore 15 has a bleeder unit 17 inserted therein intended to serve the usual function of this device as is customary in the art. In view of the fact that cylinder 8 is not rigidly mounted in the abutment elements 9 and 10, it follows that projection 14 thereon is likewise movable in the aperture in backing plate 1 through which it extends.

Figure 5:
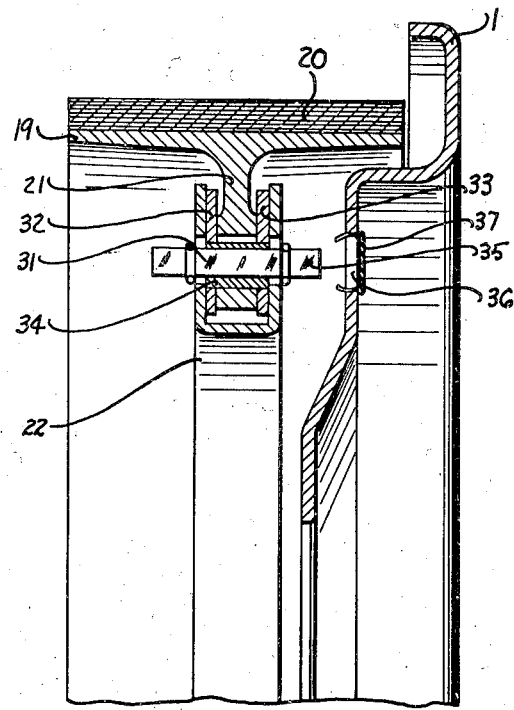
Figure 5 is a view taken substantially along the line 5—5 of Figure 1.
Figure 6:
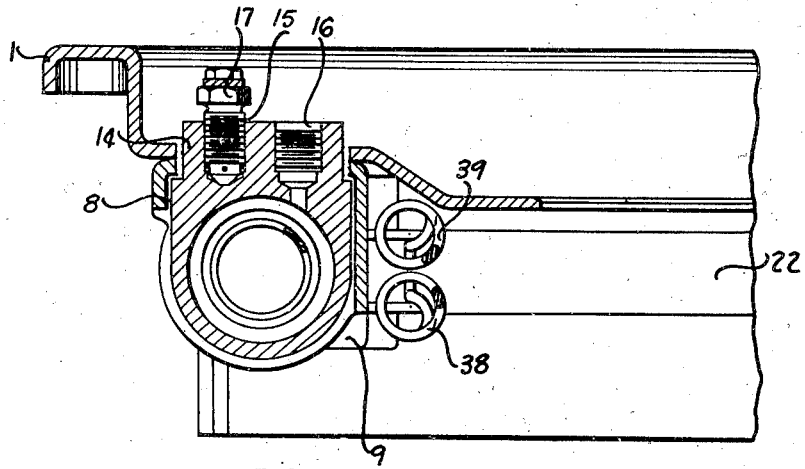
Figure 6 is a view taken along the line 6—6 of Figure 1.
Figure 7:
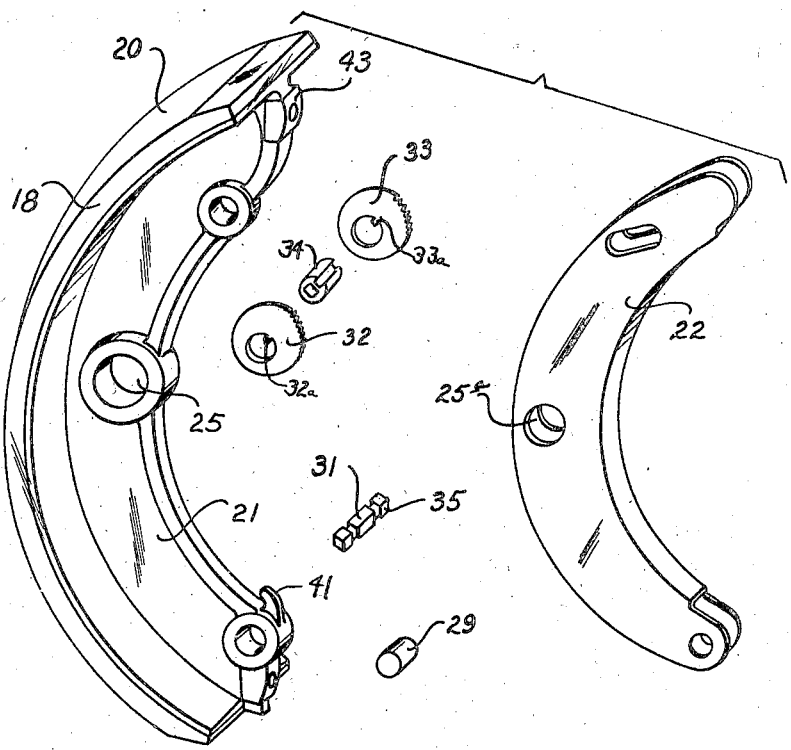
Figure 7 shows an exploded view of the shoe assembly.
Figure 8:
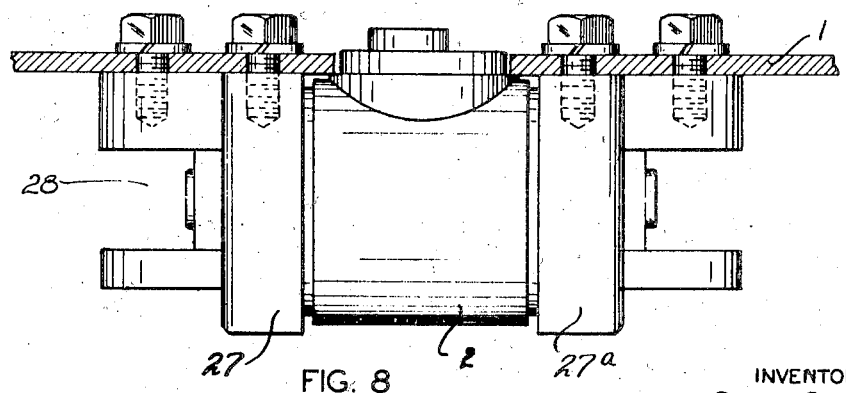
Figure 8 shows a top view of the abutments.

The brake is provided with a pair of similar shoe elements 18 and 19 provided with friction member 20, which shoes are of a T-section 21 as clearly shown in Figures 5 and 7. The T-section 21 is received within a channel member 22 for shoe 18 and channel member 23 for shoe 19. The channel members 22 and 23 maintain a constant radial position with respect to the backing plate but have a limited circumferential movement. In order to guide the substantially radial movement of shoe 18 and also shoe 19, it is supported on backing plate 1 by means of a retaining element 24 in the form of a bolt extending through an aperture in backing plate 1. This bolt is disposed within an aperture 25 formed in the T-section of the brake shoe and aperture 25a in channel 22 and said retaining element extending through the channel element 22 as observed in Figure 2. The retaining element 24 is provided with a sleeve 26 which enables the bolt to be tightened and yet permits a substantial radial movement of the shoe.

The channel member 22 is of the same general shape as the shoe element and one end thereof is received in an abutment 27 similar in construction to abutment 10 in which one end of the brake upper motor cylinder is received. Abutment 27 is appropriately slotted, as at 28, to receive the lower end of the channel element 22, as viewed in Figure 3, and a pin 29 is inserted in an aperture formed in shoe 18 which likewise extends through a coaxial aperture in element 22, thereby pivoting the two together and enabling them to pivot relatively to each other about 29 as an axis depending upon the direction of rotation of the brake drum relative to the shoe elements. The arc of slot 28 on part 27 also serves as a pivot or anchor for the shoe during forward braking action.

The opposite or upper end of the channel element 22 is abuttable against a surface 30 formed on abutment 9, which surface is substantially radial to the center of the brake assembly. This same surface 30 is also shown in 27a corresponding to element 9. The surface 30 is likewise formed as the base of a slot in which the upper end of channel 22 is received in order that side or lateral motion may be restricted during application of the brakes. By making the surface 30 radial with the center, the thrust taken up by the abutment along this surface will likewise have its radial component. The channel element 22 abutting against surface 30, as shown in Figure 1, enables the point of anchorage to be much closer to the center of the brake assembly, thereby lessening the strain produced by brake torque on the backing plate.

Each of the shoe channel abutment elements is provided with a surface 30 and the pin and slot constructions 28 and 29 in Figures 3 and 7 and, therefore, any action that takes place with respect to channel member 22 and shoe 18 takes place with respect to shoe 19 and its cooperating channel member 23.

The adjustment of the shoe for lining wear, drum wear, and the like, is effected by the structure set forth in Figure 5 in which a square bolt or rod 31 is arranged in an appropriate aperture in channel member 22 which extends through the T-section 21 of shoe 18. Arranged between the T-section and the channel member on each side of the T-section are cam elements 32 and 33, part of whose faces are serrated for greater gripping action. The bolt or rod element 31 is provided with a sleeve 34 on which the cam elements 32 and 33 are mounted. Sleeve 34 is slotted to receive tongue elements 32a and 33a (Figure 7) to prevent relative rotation of cams 32 and 33 and sleeve 34. Upon rotation of element 31 by means of an appropriate wrench applied to the squared end 35 through an aperture 36 in backing plate 1, the T-section of shoe 19 is moved relatively outwardly with respect to channel member 22 to thereby adjust the brake shoe 19 and the friction element 20 mounted thereon substantially radially of the brake assembly and drum with which it is intended to cooperate. A closure element 37 is inserted in aperture 36 in order to prevent the ingress of dirt and other foreign substances.

The means provided for retracting the brake shoes following each application of the brake comprises a spring organization having two parallel coil elements 38 and 39. The coils 38 and 39 are joined at one end by a loop or hook 40 which is a continuation of each of the wires of the coil element. This hook or loop is engageable with a hook 41 formed on the T-section 21 of shoe 19. The free ends of resilient elements 38 and 39 are hooked about rod element 31 in suitable grooves therein. The double spring is employed for the reason that should breakage occur in the spring element, the brake assembly will not be left without a retracting means. In the event of breakage in the spring it will occur substantially along the line 42 which, while disabling one of the spring elements, will leave the other effective. It has been found that springs organized as shown herein will break on one side or the other of hooks disposed about element 31 but never along its center, thereby enabling the brake assembly to have the benefit of one of the springs should the other fail at any point in service.

The shoes are provided opposite the abutments 9 and 10 with suitable enlargements 43 which are properly socketed. The connector or push-rod 11 is inserted in socket 45 in piston 3 such that when piston 3 and its associated packing seal 5 are moved outwardly, they will urge the shoe into engagement with the cooperating drum. This construction enables piston 3 and rod 11 to move substantially axially of the aperture provided in abutment 9 and prevent any side thrust in the entire assembly. In this way the brake cylinder is not positively linked with the brake shoe and enables a more independent action of the brake cylinder with respect to the shoe.

In operation, assuming that pressure fluid has been admitted to the brake cylinder through passage 16, piston rod 11 and piston 3 will be urged outwardly so as to move the upper end of shoe 18 and its friction element 20 into engagement with the drum. The same action takes place in brake cylinder 2 shown in the lower portion of the brake assembly urging the lower end of shoe 19 into engagement with the brake drum, as viewed in Figure 1. The push-rod in lower cylinder 2 opposite push-rod 46 urges the lower end of shoe 19 into engagement with the brake drum. Assuming that this motion is for the forward direction of travel, the energizing action will cause the brake shoe to be carried in the same direction the drum is rotating and in view of the construction illustrated in Figure 3, the brake thrust will be taken on abutment 27 and will not be taken on the push-rod 46 because the abutment 27 with its socket 28, in which the lower end of channel element 22 and shoe 18 are received, will take up the thrust at that point, thereby relieving the brake cylinder of the necessity of absorbing the load. The same action will, of course, take place on the upper end of the shoe and channel assembly 19 and 23.

Assume now that the rotation of the wheel and brake drum cooperating with the assembly is in a reverse direction, then piston 4 and its associated rod 13 will move axially urging the upper end of brake shoe 19 into engagement with the drum and the same action will take place with respect to the push-rod 46 and the piston that is associated therewith on the lower end of brake shoe 18. However, the thrust during reverse operation will not be taken up by the brake shoes 18 and 19 but will be taken up by the channel members 22 and 23 acting against surface 30, thereby relieving the push-rod 11 and the diametrically disposed push-rod in lower cylinder 2 from receiving the brake thrust and relieving the brake cylinder therefrom. In the reverse operation the channel element absorbs the full thrust of the brake instead of the shoe and leaves the shoe to its single function of performing the braking effect on the cooperating drum.

Figure 10:
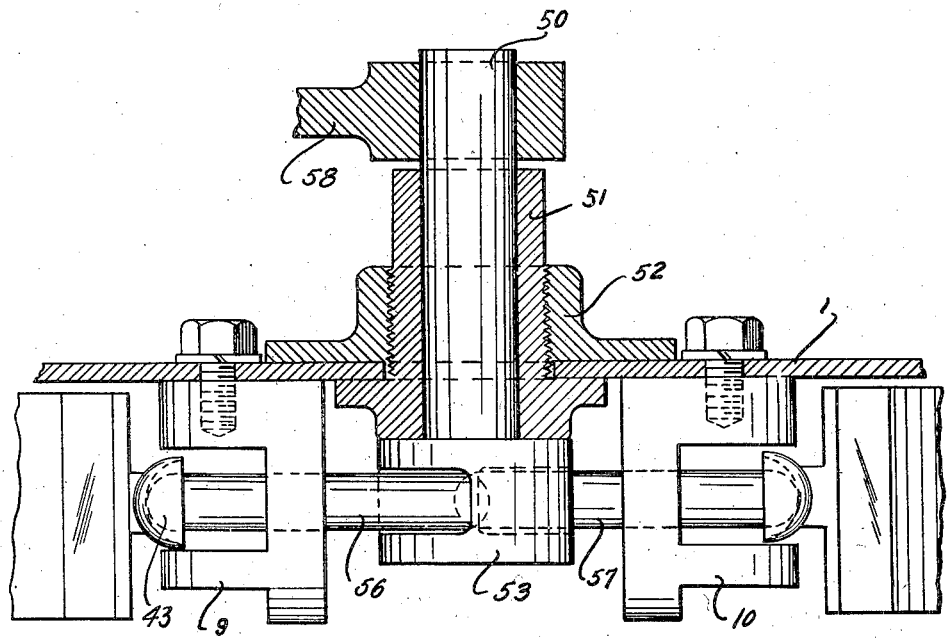
Figure 10 shows a plan view of Figure 9, partly in section.
Figure 9:
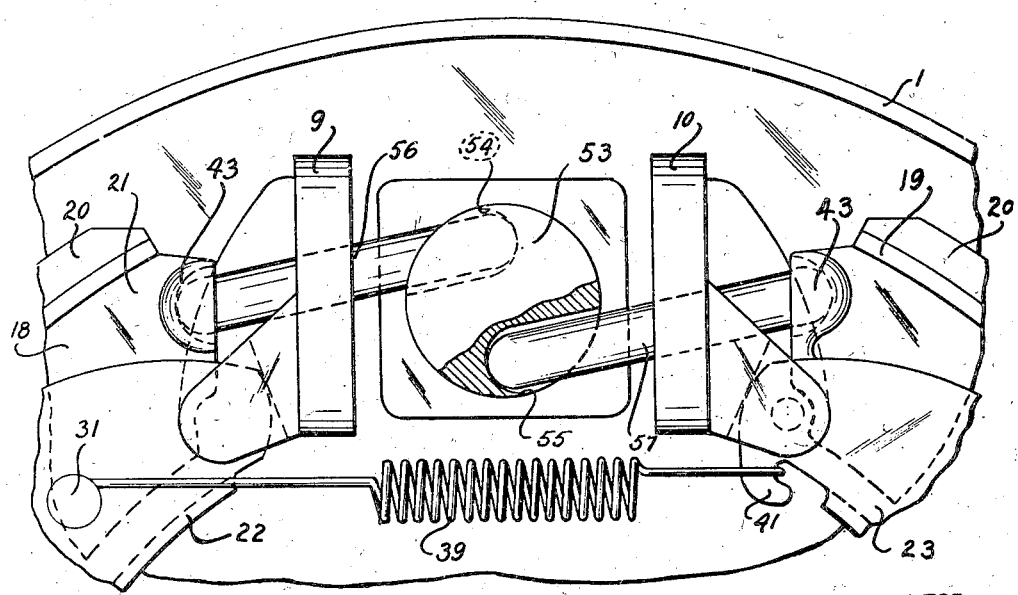
Figure 9 shows a side view of a modified form of brake.

A modification of the above structure is set forth in Figures 9 and 10 in which a mechanical operation of the brakes is employed instead of the hydraulic brake cylinder shown in the preferred embodiment. A shaft 50 is rotatably mounted in a suitable bushing 51 slidably secured to the backing plate 1 by means of a nut 52. Shaft 50 has a head 53 formed thereon in which two depressions or sockets 54 and 55 are formed. One end of each of the two push-rod members 56 and 57 is seated in each of the sockets and the opposite ends of the push-rods are seated in the sockets provided in portion 43 of brake shoes 18 and 19. An operating lever 58 is secured to the end of shaft 50 opposite head 53 with which the usual foot pedal connection and linkage is associated in order to apply the brakes. The rods 56 and 57 extend through the apertures forming abutments 9 and 10 in the same manner as rods 11 and 12 operate therein as set forth above. The relationship of the channel elements 22 and 23 with respect to brake shoes 18 and 19 and their combined relationship with the abutments 9 and 10 is exactly the same as set forth above. This modification further illustrates the fact that the particular mode of brake actuation is not limited to hydraulic but may be any mode of operation as shown. It should also be clear from the foregoing that abutments 27 and 27a absorb or take up the entire brake thrust without regard to the particular mode of brake operation employed.

Having fully described my invention, that which I claim as novel and desire to protect by Letters Patent of the United States is:

1. In a brake, a backing plate; braking means thereon; means to support said braking means on said backing plate, said braking means including a shoe and channel member and in which the shoe has movement substantially radially to said plate; a pair of abutment elements secured to said backing plate at diametrical positions, one of said abutment elements having a slot formed therein in which one end of the braking element is received, the other of said abutment elements having an abutment thereon whose surface is radial to said backing plate against which said channel is engageable; a brake cylinder supported in each of said abutment elements; piston devices in said cylinder; push-rod elements connected between said piston and said brake means; and said slotted abutment taking up the thrust from said shoe in the forward direction and said radial abutment taking up the brake thrust in the reverse direction of operation.

2. In a brake assembly, a backing plate; a pair of braking means thereon each comprising a brake shoe and a channel member receiving said brake shoe; means to support each brake shoe for radial movement with respect to said backing plate; two pairs of spaced abutment elements secured to said backing plate, one of each of said pairs of abutments having a slot formed therein; one end of each of said channel and brake shoe members pivoted together with the pivoted end received in said slot; the other of each of said pairs of abutments having an abutment surface radial to said backing plate and engageable by the other end of said channel member; a brake cylinder disposed between and movable in each of said pairs of spaced abutment elements; and said slotted abutment elements taking up the brake thrust in the forward direction of operation and said radial surface taking up the brake thrust in the reverse direction of operation through said channel member.

3. In a brake assembly, a backing plate; two pairs of abutment elements rigidly secured to said backing plate; brake elements operatively associated with said abutment elements, each of said braking elements comprising a shoe and a channel element in which said shoe is received; means to mount said shoe on said backing plate for radial movement; said channel and shoe pivoted together at one end thereof, said end receivable in a slot formed in one of each of said pairs of abutments, the latter adapted to absorb the forward brake thrust; the other abutment of each pair of abutments having an abutment surface radial to said backing plate and engageable by the opposite end of said channel element when said brake is operating in a reverse direction; the other of said abutments receiving the brake thrust in the forward direction of operation; brake cylinders in each of said pairs of abutments, said brake cylinders being movable therein; means connecting the pistons in said cylinders with the ends of said shoes; and cam means arranged between said channel member and said shoe to substantially radially adjust said shoe.

4. In a brake assembly, two pairs of abutments rigidly mounted thereon; a brake cylinder slidable in each pair of abutments; a shoe radially slidably mounted on said backing plate; a channel element associated with said shoe; cam means to adjust said shoe with respect to said channel member; one of each of said pairs of abutments being slotted, said shoe and channel member pivoted together at one end thereof and received in said slotted abutments, the point of pivot lying at a point radially inward from the abutment element, the other of each of said pairs of abutments having a radial abutment surface thereon engageable by the other end of said channel member; spring means engageable with said cam adjustment and with the opposed shoe to retract said opposite shoes; piston elements in said brake cylinder; means connecting the pistons in each of said brake cylinders with said shoes; and said pivoted ends of the shoe and channel member transmitting the brake thrust to said slotted abutments in the forward direction of movement and said channel member transmitting the reverse brake thrust to the radial surface on the other of said abutments in the reverse direction of movement.

5. In a brake assembly, a backing plate; two pairs of abutments rigidly secured to said backing plate; a brake cylinder movable in each pair of abutments; pistons in said cylinders; shoe and channel elements mounted on said backing plate such that said shoe may have radial movement with respect to said backing plate; cam means between said channel element and said shoe to radially adjust said shoe with respect to said channel element; a double spring means connected between said adjusting means and the shoe element of the opposite shoe and channel element to retract said shoes upon de-energization of said cylinders; said channel and shoe elements pivoted together at one end thereof; one of each of said pairs of abutments being slotted to receive the pivoted end of said shoe and channel members, the other of said pairs of abutments having a surface radial to said backing plate; and said slotted abutments taking up the brake thrust in the forward direction and the abutments having said radial surfaces taking up the brake thrust in the reverse direction through said channel member.

6. In a brake assembly, a backing plate; abutment means secured to said backing plate; a brake cylinder arranged between said abutments slidable in said abutments with respect to said backing plate; a pair of pistons in said cylinder; resilient means disposed between said pistons; push-rods associated with each of said pistons and extending through said abutments, said push-rods being freely movable through apertures formed in said abutments such that no thrust will be transferred from said abutments to said push-rods; and means surrounding said push-rods and enclosing the open ends of said cylinder to prevent the ingress of foreign matter to said cylinder.

7. In a brake, a backing plate; a shoe and channel member operatively associated; means to pivot said shoe and channel member together at one end thereof; means to support said shoe on said backing plate for radial movement with respect to said backing plate; abutment elements operatively engaged with each end of said shoe and channel member; and means disposed between said channel member and said shoe to pivot said channel member with respect to said shoe to thereby radially adjust said shoe with respect to said backing plate.

8. In a brake, a backing plate; abutment elements secured to said backing plate on substantially opposite sides of said backing plate; a channel member and shoe slidably mounted on said backing plate whose ends are engageable with said abutment members; a slot formed in one of said abutment members; means pivoting said channel member to said shoe at one end thereof, said end receivable in said slot; a radial abutment surface on the other of said abutment members and engageable by said channel member; and means disposed between said channel member and said shoe to radially adjust said shoe with respect to said backing plate by pivoting said shoe on said pivot relatively to said channel member.

9. In a brake, a backing plate; abutment elements disposed on substantially opposite sides thereof, one of said abutments having a radial surface thereon, the other of said abutments having a slot formed in a portion disposed inwardly from the body of said abutment; a brake assembly comprising a shoe and a channel member, said shoe and channel member pivoted together at one end thereof and said pivoted end received in said slot, the other end of said channel member engageable with said radial surface; said slotted abutment receiving the brake thrust in one direction of operation and the radial surface receiving the brake thrust in the opposite direction of rotation; means to slidably mount the shoe member on said backing plate; and cam means arranged between said shoe and channel member to pivot said shoe with respect to said channel member about said pivot substantially radially to said backing plate.

10. In a brake, a backing plate; two pairs of abutment elements rigidly secured to said backing plate; brake cylinders mounted between said abutment elements and axially movable with respect to said elements; a pair of brake elements mounted on said backing plate for radial movement with respect thereto, each of said braking elements comprising a shoe and a channel member, one element of each of said abutment elements being slotted in a portion thereof extending radially inwardly from the respective abutment elements; said channel member and shoe pivoted together at one end and received in said inwardly extending slotted abutment element; a radial abutment surface formed on the other of said abutment elements and engageable with the other end of said channel member; cam means disposed between said channel member and said shoe to pivot said shoe with respect to said channel member about said pivot to adjust said shoe radially of said backing plate; piston elements in said brake cylinder; means connecting said pistons and the ends of said brake shoe and said inwardly extending abutment element taking up the brake thrust in the forward direction and the radial abutment surface absorbing the brake thrust in the reverse direction through said channel member; and spring means connecting said adjustment means and the opposite shoe means to retract said brake shoes following each outward radial movement of the brake shoes.

11. In a brake, a backing plate; a pair of spaced abutments disposed substantially diametrically on said backing plate; a pair of brake shoe and channel assemblies mounted on said backing plate for radial movement with respect to said plate; one of each pair of abutments having a slotted portion extended radially inwardly, the other of each pair of abutments having a radial abutment surface; said channel and shoe member pivoted together, said pivoted end received in said slotted portion, the other end of said channel member engageable with said radial surface; means disposed between said abutments to engage said shoe elements to operate said brakes; and said slotted abutments taking up the forward brake thrust and the radial abutment surfaces taking up the reverse brake thrust through said channel member.

12. In a brake, a backing plate; a pair of spaced abutments spaced at substantially diametrically opposite positions on said backing plate; a brake shoe mounted on said backing plate for radial movement; a channel element receiving said shoe; one of each of said abutments having a slotted portion and the other having a radial abutment surface; said channel and brake shoe pivoted together at one end, said pivoted end received in said slotted abutment; the other end of said channel engageable with said radial surface; means disposed between said abutments to operate said shoes; and the forward brake thrust taken up by said slotted abutment through said shoe and the reverse brake thrust taken up by said abutment having said radial surface through said channel member.

13. In a brake, a backing plate; a pair of spaced abutments, each pair spaced at substantially diametrically opposite positions on said backing plate; a brake shoe mounted on said backing plate for radial movement; a channel element receiving said shoe; one of each of said abutments having a slotted portion and the other having a radial abutment surface; said channel and brake shoe pivoted together at one end; said pivoted end received in said slotted abutment; the other end of said channel engageable with said radial abutment surface; means disposed between said spaced abutments to operate said shoes; the forward brake thrust taken up by said slotted abutment through said shoe and the reverse brake thrust taken up by said radial abutment surface through said channel element; and cam means disposed between said channel and said shoe to adjust said shoe radially to said backing plate.

14. In a brake, a backing plate; a pair of spaced abutments disposed at substantially diametrically opposite positions on said backing plate; a brake shoe mounted on said backing plate for radial movement with respect to said backing plate; a member cooperating with said shoe; one of each of said abutments having a slotted portion and the other having a radial abutment surface; said member and brake shoe pivoted together at one end, said pivoted end received in said slotted abutment; the other end of said member engageable with said radial abutment surface; means disposed between each of said pair of abutments to operate said shoes; the forward brake thrust taken up by said slotted abutment through said shoe and the reverse brake thrust taken up by said radial abutment surface through said channel member; cam means disposed between said member and said shoe to radially adjust said shoe with respect to said backing plate; and spring means connecting the cam means with the opposite shoe to return said shoes to retracted position following each actuation of said brake.

15. In a brake, a backing plate; a pair of spaced abutments spaced at substantially diametrically opposite positions on said backing plate; a pair of brake shoes mounted on said backing plate for radial movement with respect to said backing plate; a member associated with each of said shoes; one of each of said abutments being slotted and the other having a radial abutment surface; each of said members and brake shoes pivoted together at one end thereof with said pivoted end received in said slotted abutment; the other end of said member engageable with said radial abutment surface; means disposed between each pair of abutments to operate said shoes; and the forward brake thrust taken up by the slotted abutment through said shoes and the reverse brake thrust taken up by said radial surface through said channel members.

16. In a brake, a backing plate; a pair of spaced abutments with each pair mounted at substantially diametrically opposite positions on said backing plate; a pair of brake shoes mounted on said backing plate for radial movement with respect thereto; a member operatively associated with each of said shoes; one of each of said pairs of abutments having a slotted portion disposed radially inwardly from the abutments and the other of said abutments having a radial abutment surface thereon; each of said member and associated brake shoe pivoted together at one end with said pivoted end received in said slotted abutment and the other end of said member engageable with said radial abutment surface; cam means to adjust said shoe with respect to said member; cam means disposed between each of said abutments; means connecting said cam means and the ends of said shoes to actuate said shoes upon rotation of said cam; and the forward brake thrust of said brakes taken up by the slotted abutments through said shoes and the reverse brake thrust taken up by the radial abutment surfaces through said channel members.

17. A brake mechanism comprising a brake shoe element and a second element pivoted to the shoe element at a point adjacent one end of each of said elements; abutment means for the pivoted end of the shoe element and other abutment means engageable by one end of the second element; and means cooperating with said elements to adjust the relative position of the unpivoted ends thereof.

18. A brake mechanism comprising a backing plate; a shoe; a member; means to pivot one end of said shoe to one end of said member; an abutment element for the pivoted end of said shoe to receive the forward brake thrust; an abutment element engageable by the free end of said member to receive the reverse brake thrust transmitted through said member; and means to move the free end of said shoe with respect to said member to radially adjust said shoe with respect to said backing plate.

19. A brake mechanism comprising a backing plate; a plurality of sets of spaced abutments mounted on said backing plate; a brake assembly disposed between each set of abutments, each assembly consisting of a member and a brake shoe operatively asociated at one end thereof to one end of said member; means arranged between the abutments of each set operatively engageable with the ends of said shoes to actuate same, said brake assembly being so constructed and arranged that one of the spaced abutments of each set receives the forward brake thrust of said shoe and the other abutment of each set receives the reverse brake thrust through said member; and means disposed between said member and said shoe in each assembly to adjust said shoe with respect to said backing plate.

STEVE SCHNELL.

REFERENCES CITED

The following references are of record in the file of this patent:

UNITED STATES PATENTS

| Number | Name | Date |
| --- | --- | --- |
| 1,963,969 | Burnett | June 26, 1934 |
| 2,149,651 | White | Mar. 7, 1939 |
| 2,152,066 | LaBrie | Mar. 28, 1939 |
| 2,322,121 | Frank | June 15, 1943 |